United States Patent
Ha et al.

(10) Patent No.: US 11,414,028 B2
(45) Date of Patent: Aug. 16, 2022

(54) VEHICULAR ENGINE ROOM MANUFACTURING METHOD

(71) Applicant: HADO FNC CO., LTD., Pocheon-si (KR)

(72) Inventors: Jong Eun Ha, Pocheon-si (KR); Young Su Kim, Pocheon-si (KR)

(73) Assignee: HADO FNC CO., LTD., Pocheon-si (KR)

( * ) Notice: Subject to any disclaimer, the term of this patent is extended or adjusted under 35 U.S.C. 154(b) by 595 days.

(21) Appl. No.: 16/472,227

(22) PCT Filed: Dec. 22, 2017

(86) PCT No.: PCT/KR2017/015368
§ 371 (c)(1),
(2) Date: Jun. 21, 2019

(87) PCT Pub. No.: WO2018/117743
PCT Pub. Date: Jun. 28, 2018

(65) Prior Publication Data
US 2020/0086809 A1    Mar. 19, 2020

(30) Foreign Application Priority Data
Dec. 23, 2016   (KR) ........................ 10-2016-0178363

(51) Int. Cl.
*B29C 43/02*     (2006.01)
*D01G 15/00*    (2006.01)
(Continued)

(52) U.S. Cl.
CPC ........ *B60R 13/0838* (2013.01); *B29C 43/003* (2013.01); *D04H 1/498* (2013.01);
(Continued)

(58) Field of Classification Search
CPC ...... B29C 43/003; B29C 43/02; D01G 15/00; D04H 1/4242; D04H 1/435; D04H 1/46;
(Continued)

(56) References Cited

U.S. PATENT DOCUMENTS

2004/0112501 A1 * 6/2004 Dittmar ................. B29C 70/506
                                                                                      156/62.2
2009/0252943 A1    10/2009  Takeda et al.
(Continued)

FOREIGN PATENT DOCUMENTS

JP          2986252 B2 * 12/1999  ............... D06C 7/00
JP       2011-241503       12/2011
(Continued)

*Primary Examiner* — Leo B Tentoni
(74) *Attorney, Agent, or Firm* — Lex IP Meister, PLLC

(57) ABSTRACT

Disclosed is a vehicular engine room manufacturing method wherein the engine room has excellent heat resistance and sound-absorbing characteristics, and scraps generated during the manufacturing process can be recycled. The vehicular engine room manufacturing method comprises the steps of: carding a thermoplastic fiber and a carbon fiber having a length of 10 to 150 mm and needle-punching the same, thereby forming a felt layer; applying heat and pressure to the felt layer, thereby forming a felt board; and applying heat to the felt board and shaping the same is formed in a desired shape.

1 Claim, 1 Drawing Sheet

(51) Int. Cl.
*D04H 1/4242* (2012.01)
*D04H 1/435* (2012.01)
*D04H 1/46* (2012.01)
*D04H 17/00* (2006.01)
*D04H 18/02* (2012.01)
*D06C 7/00* (2006.01)
*B60R 13/08* (2006.01)
*D04H 1/498* (2012.01)
*D04H 5/02* (2012.01)
*D04H 3/105* (2012.01)
*D04H 3/005* (2012.01)
*D04H 3/011* (2012.01)
*D04H 17/10* (2006.01)
*B29C 43/00* (2006.01)
*B32B 5/02* (2006.01)
*B32B 5/26* (2006.01)
*B32B 27/12* (2006.01)
*D04H 13/00* (2006.01)

(52) U.S. Cl.
CPC ............ *D04H 3/005* (2013.01); *D04H 3/011* (2013.01); *D04H 3/105* (2013.01); *D04H 5/02* (2013.01); *D04H 17/10* (2013.01); *B32B 5/022* (2013.01); *B32B 5/26* (2013.01); *B32B 27/12* (2013.01); *B32B 2262/0276* (2013.01); *B32B 2307/102* (2013.01); *D04H 13/00* (2013.01); *D10B 2101/12* (2013.01); *D10B 2331/04* (2013.01); *D10B 2505/12* (2013.01)

(58) Field of Classification Search
CPC .......... D04H 5/02; D04H 17/00; D04H 18/02; D06C 7/00; D10B 2505/12
USPC ............ 264/103, 324; 19/98, 145, 296, 299; 28/107
See application file for complete search history.

(56) References Cited

U.S. PATENT DOCUMENTS

2013/0192434 A1 8/2013 Hashimoto et al.
2015/0140306 A1 5/2015 Endo et al.

FOREIGN PATENT DOCUMENTS

| | | |
|---|---|---|
| JP | 4951507 | 6/2012 |
| JP | 2014-050982 | 3/2014 |
| KR | 10-2015-0040867 | 4/2015 |
| WO | 2012-086682 | 6/2012 |

* cited by examiner

# VEHICULAR ENGINE ROOM MANUFACTURING METHOD

FIELD OF THE INVENTION

This invention relates to a vehicular engine room manufacturing method, and more particularly to a method for manufacturing a vehicular engine room that has excellent heat-resistance and sound-absorption characteristics, and then scraps generated during the manufacturing process can be recycled.

BACKGROUND OF THE INVENTION

Extraneous noises, for example friction sound between tire and ground, sound caused by high temperature and high pressure combustion gas flow in exhaust system, engine penetration sound which is generated in an engine and transferred to through autobody or air and so on are introduced through various paths into an inside of the vehicle on driving, which is an element hindering the quietness of the vehicle.

Generally, an engine cover or a hood insulator is used for suppressing the engine penetration sound or noise among the extraneous noises, but these alone have limitations in reducing engine penetration noise to a desired level.

The engine room is arranged in front of the vehicle, particularly a passenger car, and in which are gathered main devices being power sources of automobiles, such as an engine, a transmission, a cooling device, a generator and the like. The upper part of the engine room is equipped with a bonnet installed for opening and closing, which serves as a cover to protect the above main devices Conventionally, in order to reduce the noise generated in the engine room, an engine room has been manufactured using various materials such as carbon fiber reinforced plastics (CFRP) by performing complex processes. More specifically, for example, a carbon fiber is prepared in a unidirectional (UD) or fabric form, then impregnated with a resin such as an epoxy resin, and a resin-impregnated carbon fiber is laminated to produce a material for an engine room. The material for the engine room is molded into a desired shape and then trimmed to the engine room using carbon fiber reinforced plastic. In such a case, since complicated and many processes must be performed, a large amount of loss is generated in the carbon fiber-reinforced plastic during the above process, and the scrap generated during the above process cannot be recycled, mostly dumped (discarded).

Further, due to the characteristics of the engine room, when the vehicle is driving, that is, when the engine is operating, not only high temperature heat but also large amounts of noise and vibration are generated.

Therefore, it is required to develop a material having excellent heat-resistance and sound-absorption characteristics as well as being able to recycle scrap generated in the production of engine room using carbon fiber reinforced plastic.

SUMMARY OF THE INVENTION

Therefore, it is an object of the present invention to provide a method for manufacturing a vehicular engine room in which scraps generated during the manufacturing process can be recycled.

It is another object of the present invention to provide a method for manufacturing a vehicular engine room that has more excellent heat-resistance and sound-absorption characteristics and is lighter than the conventional.

In order to achieve these objects, the present invention provides a method for manufacturing a vehicular engine room, comprising the steps of: carding a thermoplastic fiber and a carbon fiber having a length of 10 to 150 mm and needle-punching the same, thereby forming a felt layer; applying heat and pressure to the felt layer, thereby forming a felt board; and applying heat to the felt board and molding the same, thereby forming a desired shape.

The method for manufacturing the vehicular engine room according to the present invention enables recycling the scraps generated in process of engine room manufacturing. Also, according to the present method, the engine room has excellent heat-resistance and sound-absorption characteristics and can shield an electromagnetic wave generated in engine room. In addition, the method for manufacturing a vehicular engine room according to present invention has some advantages that it is relatively simple manufacturing process and has a low manufacturing cost.

DETAILED DESCRIPTION OF THE INVENTION

Hereinafter, this invention is described in more detail by referring to attached drawings.

Figure 1:
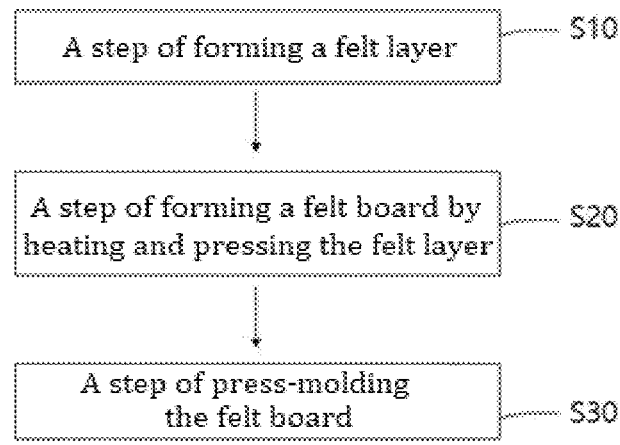
FIG. 1 is a flowchart for illustrating a method for manufacturing an engine room for vehicle according to an embodiment of the present invention.
Figure 2:
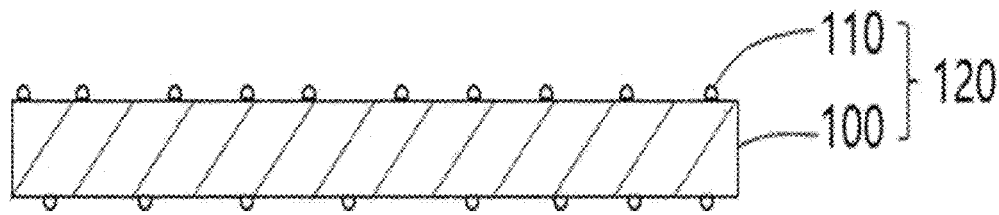
FIG. 2 and FIG. 3 are cross-sectional view and photographs of surface of a felt board formed according to an embodiment of the present invention.
Figure 3:
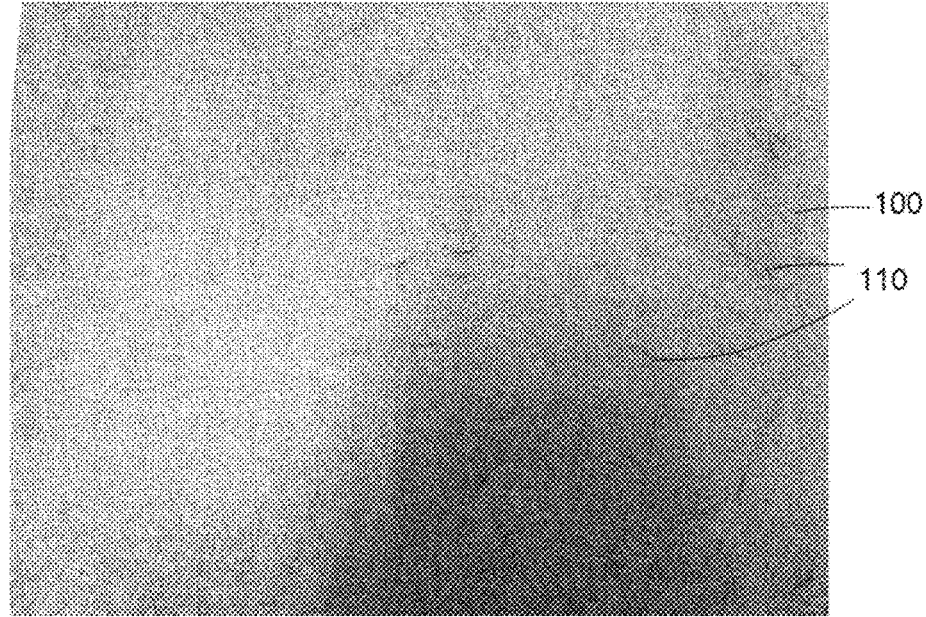

FIG. 1 is a flowchart for illustrating a method for manufacturing an engine room for vehicle according to an embodiment of the present invention and FIG. 2 and FIG. 3 are cross-sectional view and photographs of surface of a felt board formed according to an embodiment of the present invention. As shown in FIGS. 1 to 3, vehicular engine room (engine compartment) manufacturing method according to a present invention comprises: a step of forming a felt layer (S10); a step of forming a felt board by heating and pressing the felt layer (S20); and a step of press-molding the formed felt board using molding (S30).

In the step of forming the felt layer (pre-molded object) (S10), firstly filament blending of a carbon fiber having a length of 10 to 150 mm, preferably 50 to 100 mm and a thermoplastic fiber, preferably low-melting polyester fibers (for example, low melt polyethylene terephthalate (LM PET) and so on) is performed. Here, when the ordinary polyester fiber is included in the filament blending, the melting point increases and a large amount of heat is required. Therefore, it is preferable not to include ordinary polyester fibers. In addition, if length of the carbon fiber is too short, it may be scattered by wind or the resultant do not have the desired properties, and if the length of the carbon fiber is too long, scraps generated during the manufacturing process may not be recycled, or the process efficiency may be lowered. Here, the scraps mean some kinds of fragments (carbon fiber, or mixture of carbon fiber and thermoplastic fiber) generated in the engine room manufacturing process. In addition, a melting point of the low melting polyester fibers is 110 to 170° C., preferably 110 to 130° C., and the carbon fiber may be replaced with a super fiber such as a glass fiber or an aramid fiber or may be used in combination with them, wherein the super fibers mean fibers having characteristics of high-strength and high-elasticity equal to or higher than that of metal.

Next, the felt layer 100 is formed by carding the filament-blended carbon fiber and thermoplastic fiber to form fiber sheets or web, and then by needle punching the same to bond fibers. The needle punching is a method in which a plurality of needles is used to take a fiber sheet or a web to move some fibers upward or downward so that the fibers are entangled, and the fibers are joined by frictional force. The carbon fibers and the thermoplastic fibers are subjected to a carding process to form a fibrous web, which is then subjected to a needle punching process, whereby the fibrous webs can be bonded to form the felt layer. Due to the needle punching process, the thickness of the fibrous web is reduced, and several fibrous strands is formed on the surface of the felt layer.

In addition, when the carbon fiber and the low melting point polyester fiber are carded, a high humidity is effective, for example, a relative humidity of 60% or more.

The content of carbon fiber and thermoplastic fiber can be appropriately selected depending on the user, preferably content of carbon fiber is 10 to 80 wt % (% by weight), more preferably 30 to 60 wt %, content of the thermoplastic fiber is 20 to 90 wt %, more preferably 40 to 70 wt %. When the content for carbon fiber is too little, the desired properties such as heat resistance and weight may not be secured and when the content is too much, due to the vortex phenomenon and/or the electrostatic charge of the carbon fibers during the carding, the operation of the carding machine may be problematic.

Next, in the step of forming the felt board 120 (S20), the felt layer 100 is thermally bonded to form the felt board 120 using a pressing roller or the like. The thermally press-bonding of the felt layer 100 is to melt and press the fiber strands (for example, low melting point polyester fiber) located on the surface of the felt layer to form the heat-treatment layer 110 on the surface of the felt layer. By forming the heat treatment layer 110, it is possible to prevent the fiber strands placed inside the felt layer from protruding to the surface of the felt layer. The thermal compression-bonding temperature may be appropriately selected, but it is preferably 150 to 200° C.

The heat treatment layer 110 may be formed by directly fusing the fibers for forming the felt layer 100, or by melting the fiber strands on the surface of the felt layer 100 and the low melting point polyester fibers so as to form a plurality of bumps having a predetermined size. The bumps may be placed in distributed form, and the bumps may be formed to only one side of felt board, but preferably formed to both sides. Thickness of the felt layer is 2 to 8 mm, preferably 3 to 6 mm and thickness of the heat treatment layer 110 is more than 0 to 2 mm, preferably 0.1 to 1 mm. Here, when thicknesses of the felt layer 100 and the heat treatment layer 110 are out of the above range, the desired physical properties such as heat resistance may not be satisfied.

In the step of compression-molding (S30), after forming the felt board 120, the felt board 120 is compression-molded using molding in accordance with the normal method to manufacture a vehicular engine room. Further if the felt board 120 is preheated at a temperature of 280 to 300° C. before performing the compression-molding and then is molded, it is more effective to mold the felt board into a desired shape.

The engine room manufactured by the method for according to present invention, has excellent heat-resistance so as to withstand the high temperature of the engine room (for example, 200 to 250° C.), can shield electromagnetic waves which may be generated from a vehicle such as an electric car or electronic devices in a dash board, and also has excellent sound-absorption to reduce the noise generated in the engine room. Further, since the engine room is manufactured using the carbon fibers having a short length, the scraps generated in the engine room manufacturing process can be recycled, which is economical.

While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the invention.

The invention claimed is:

1. A method for manufacturing a vehicular engine room, comprising the steps of:
   carding a carbon fiber having a length of 10 to 150 mm and a thermoplastic fiber and then needle-punching the same, thereby forming a felt layer;
   applying heat and pressure to the felt layer, thereby forming a felt board; and
   applying heat to the felt board and molding the same, thereby forming a desired shape,
   wherein in the step of forming the felt board, the heat and pressure are applied so as to prevent the fibers located inside the felt layer from protruding out of the surface thereof and simultaneously so to melt and bond the fiber strands protruding out of the surface to form a heat treatment layer,
   the thickness of the felt layer is 2 to 8 mm and the thickness of the heat treatment layer is 0.1 to 2 mm,
   the content of the carbon fiber is 10 to 80 wt %, and the content of the thermoplastic fiber is 20 to 90 wt %, and
   the thermoplastic fiber is low melting polyester fiber having a melting point of 110 to 130° C.

* * * * *